(12) United States Patent
Lamon et al.

(10) Patent No.: US 6,521,012 B2
(45) Date of Patent: Feb. 18, 2003

(54) OLEOPHOBIC COATED MEMBRANES

(75) Inventors: Steven Lamon, San Diego, CA (US); Richard McDonogh, San Diego, CA (US)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/846,772

(22) Filed: May 1, 2001

(65) Prior Publication Data

US 2002/0189455 A1 Dec. 19, 2002

(51) Int. Cl.[7] .................. B01D 46/10; B01D 39/16
(52) U.S. Cl. ............... 55/524; 55/DIG. 5; 96/12; 427/255.6; 427/385.5; 428/98
(58) Field of Search ............ 95/45–55; 96/10–13; 55/524, DIG. 5; 427/255.6, 385.5; 428/98

(56) References Cited

U.S. PATENT DOCUMENTS

| | | |
|---|---|---|
| 3,083,118 A | 3/1963 | Bridgeford |
| 3,870,767 A | 3/1975 | Grimaud et al. |
| 4,366,299 A | 12/1982 | Dessaint |
| 4,557,955 A | 12/1985 | Walch et al. |
| 4,592,930 A | 6/1986 | Schmidt et al. |
| 4,592,939 A * | 6/1986 | Temple et al. ............... 428/64 |
| 4,613,544 A | 9/1986 | Burleigh |
| 4,695,595 A * | 9/1987 | Blount ................. 521/99 |
| 4,764,560 A | 8/1988 | Mitchell |
| 4,778,596 A | 10/1988 | Linder et al. |
| 4,833,188 A | 5/1989 | Kortmann et al. |
| 4,855,162 A | 8/1989 | Wrasidlo et al. |
| 4,995,028 A * | 2/1991 | Boling et al. ............ 369/275.5 |
| 5,032,450 A | 7/1991 | Rachlicz |
| 5,066,683 A | 11/1991 | Dillon et al. |
| 5,156,780 A | 10/1992 | Kenigsberg et al. |
| 5,217,802 A | 6/1993 | Scarmoutzos |
| 5,260,360 A | 11/1993 | Mrozinski et al. |
| 5,283,112 A * | 2/1994 | Krishnan .................. 96/12 X |
| 5,286,279 A | 2/1994 | Wu |
| 5,286,382 A | 2/1994 | Scarmoutzos et al. |
| 5,352,513 A | 10/1994 | Mrozinski et al. |
| 5,462,586 A | 10/1995 | Sugiyama et al. |
| 5,554,414 A | 9/1996 | Moya et al. |
| 5,629,084 A | 5/1997 | Moya |
| 5,856,246 A | 1/1999 | Witzko et al. |
| 5,981,614 A * | 11/1999 | Adiletta ................... 95/46 X |

* cited by examiner

Primary Examiner—Robert H. Spitzer
(74) Attorney, Agent, or Firm—Knobbe, Martens, Olson & Bear LLP

(57) ABSTRACT

The present invention relates to oleophobic filtration media including polymeric membranes and other substrates that are coated with polymerized substituted or unsubstituted para-xylene. A method of coating such substrates with polymerized substituted or unsubstituted para-xylene is also provided. The coated substrates possess both hydrophobic (water repellent) and oleophobic (oil repellent) properties.

29 Claims, No Drawings

OLEOPHOBIC COATED MEMBRANES

FIELD OF THE INVENTION

The present invention relates to oleophobic filtration media including polymeric membranes and other substrates that are coated with polymerized substituted or unsubstituted para-xylenes. A method of coating such substrates with polymerized substituted or unsubstituted para-xylenes is also provided. The coated substrates possess both hydrophobic (water repellent) and oleophobic (oil repellent) properties.

BACKGROUND OF THE INVENTION

Oleophobic filtration media, including membranes and substrates, are preferred for filtration of gases, in venting filters, and as gas vents. These oleophobic filtration media allow gases and vapors to pass through the filter while liquid water is repelled. Oleophobic filtration media are preferred for filters in healthcare and related industries, for example, as vent filters for intravenous (IV) fluids and other medical devices. In the health care industry, such filters must be sterilized before use.

Polytetrafluoroethylene (PTFE) has been the most common material in filters for gas venting. PTFE is chemically and biologically inert, has high stability, and is hydrophobic. PTFE filters therefore allow gases to be selectively vented while being impervious to liquid water. PTFE membranes can be sterilized for health-related applications with steam or by chemical sterilization without losing integrity.

Treating PTFE membranes with steam can cause pore blockage due to condensation of oil from the machinery that generates the steam. The resulting loss of air permeability reduces the membrane's ability to serve as an air vent. Although chemical sterilization minimizes exposure of the membrane to oil, chemical sterilization uses toxic chemicals and can generate byproducts which cause waste disposal problems. Ionizing radiation has also been preferred for sterilization of materials in medical and biological devices. PTFE is unstable toward ionizing radiation. Irradiated PTFE membranes have greatly reduced mechanical strength and are generally not preferred for applications where they are subjected to even moderate pressures.

Perhaps the two biggest drawbacks to PTFE as a filter for venting gases are the high cost and the low air permeability of PTFE membranes. PTFE membranes are formed by extruding and stretching PTFE. Both the PTFE raw material and the processing to form the PTFE membranes are expensive. Further, the extruding and stretching processes preferred for forming PTFE membranes create membranes which have relatively low air permeability.

The oleophobicity of PTFE can be improved by impregnating or coextruding the PTFE with siloxanes (for example, U.S. Pat. No. 4,764,560), fluorinated urethane (U.S. Pat. No. 5,286,279), or perfluoro-2,2-dimethyl-1,3-dioxole (U.S. Pat. No. 5,116,650). Although the oil resistance of the PTFE is improved, the treated PTFE membranes are expensive, and air permeability remains fairly low. As a result, efforts have been made to identify alternative substrates which are less expensive and have higher air permeability than PTFE and which can be modified by coating to be hydrophobic and oleophobic.

Coating filtration substrates allows one to retain the desirable bulk properties of the substrate while only altering the surface and interfacial properties of the substrate. Coating substrates to increase their hydrophobic and oleophobic properties has not been practical, because the coatings can reduce permeability. Furthermore, many of the coating materials are expensive.

Scarmoutzos (U.S. Pat. No. 5,217,802) modified the surface of substrates made of nylon, polyvinylidene difluoride (PVDF), and cellulose by treating the substrate with a fluorinated acrylate monomer. The substrate was sandwiched between two sheets of polyethylene, and the monomer was polymerized by exposing to ultraviolet light. The resulting composite filters had hydrophobic and oleophobic surfaces. The air permeability of the filters decreases with time.

Moya (U.S. Pat. No. 5,554,414) formed composite filters from polyethersulfone and PVDF membranes with a method similar to that of Scarmoutzos. The resulting filters did not wet with water or hexane. The disadvantage of the Moya filters is that air permeability of the treated filters was lower than the untreated substrates, and the fluorinated monomer is expensive.

Sugiyama et al. (U.S. Pat. No. 5,462,586) treated nylon fabric and PTFE membranes with solutions containing two different preformed fluoropolymers. The treated filters were resistant to water and oils. The durability of filters coated with preformed polymers is often less than that for filters where the coating is formed by polymerizing a monomer on the surface of the substrate.

Kenigsberg et al. (U.S. Pat. No. 5,156,780) treated a variety of membranes and fabrics with solutions of fluoroacrylate monomers and formed coatings on the substrate by polymerizing the monomer. The coating conferred oil and water repellency onto the substrate. However, the airflow through the treated membrane was reduced, compared to the untreated membrane.

Hydrophobic media suitable for garments have been made by extruding mixtures of polypropylene or PTFE and the fluorochemical oxazolidinone as disclosed in U.S. Pat. No. 5,260,360. The media made by extruding tend to have relatively low air permeability.

In copending U.S. application Ser. No. 09/323,709 filed Jun. 1, 1999, oleophobic and hydrophobic filters are prepared by forming a polydimethylsiloxane coating on a polymeric substrate by polymerizing vinyl terminated siloxane with a crosslinker such as hydrosilicon in the presence of a catalyst.

SUMMARY OF THE INVENTION

In a first embodiment of the present invention, a coated filter is provided including a polymeric substrate and a coating, the coating including a polymeric para-xylene.

In one aspect of the first embodiment, the coating renders the coated filter permanently oleophobic.

In another aspect of the first embodiment, the polymeric substrate includes polysulfone. The polysulfone may include polyalkylsulfone, polyethersulfone, or polyarylsulfone. Alternatively, the polymeric substrate may include a polymer such as polyvinylidene fluoride, polyolefin, polytetrafluoroethylene, poly(tetrafluoroethylene-co-ethylene), acrylic copolymer, polyamide, nylon, polyester, polyurethane, polycarbonate, polystyrene, polyethylene-polyvinyl chloride, polyacrylonitrile, cellulose, or mixtures thereof. The polyolefin may include polyethylene, polypropylene, or mixtures thereof.

In a further aspect of the first embodiment, the polymeric substrate includes a porous membrane. The porous membrane may include an isotropic membrane.

In yet another aspect of the first embodiment, the porous membrane may include an asymmetric membrane. The asymmetric membrane may have a supporting structure, a first porous face having a first average pore diameter and a second porous face having a second average pore diameter, wherein an asymmetry between the first average pore diameter and the second average pore diameter is at least about 2:1, 5:1, 10:1, 20:1, or 200:1

In a further aspect of the first embodiment, the supporting structure includes an isotropic region adjacent the second porous face, the isotropic region having a substantially constant pore size, the supporting structure further including an asymmetric region adjacent the isotropic region. The isotropic region may extend through from about 5% to about 80%, or from about 15% to about 50%, of the supporting structure. The second average pore diameter may be between about 0.01 $\mu$m and about 50.0 $\mu$m, between about 0.05 $\mu$m and about 20.0 $\mu$m, or less than about 0.01 $\mu$m.

In another aspect of the first embodiment, the polymeric substrate includes a material such as nonwoven material, woven material, or melt blown material.

In a further aspect of the first embodiment, the poly-para-xylene includes a polymonochloro-para-xylene or an unsubstituted poly-para-xylene.

In another aspect of the first embodiment, the coated filter further includes a support, wherein the coated filter is bonded to the support. The support may include a fabric. The support may include a material such as a woven material or a nonwoven material.

In a second embodiment of the present invention, a method of producing a coated filter is provided, the method including the steps of: providing a para-xylene dimer and a polymeric substrate; vaporizing the para-xylene dimer to form a para-xylene dimer vapor; pyrolyzing the para-xylene dimer vapor to form a reactive paraxylene monomer; depositing the reactive para-xylene monomer on the polymeric substrate, whereby a poly-para-xylene coating is formed on the substrate; and recovering a coated filter.

In one aspect of the second embodiment, the method further includes the steps of: providing a support; and bonding the coated filter to the support.

In another aspect of the second embodiment, the method further includes the steps of: providing a support; and bonding the polymeric substrate to the support.

DETAILED DESCRIPTION OF THE PREFERRED EMBODIMENT

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

There is a need for oleophobic and hydrophobic filtration media which are inexpensive and have high air permeability. Specifically, there is a need for a coating for membranes and other substrates that renders them oleophobic and hydrophobic. There is also a need for a more cost-effective process of making oleophobic filtration media.

By providing membranes and other substrates with parylene coatings, treated filtration media are obtained that have high permeabilities for air flow and reject liquid water, as evidenced by high water penetration pressures. The filtration media are useful, for example, as air filters or vent filters for intravenous (IV) or other medical devices. The critical surface tension for spreading ($\gamma_c$), which is defined as the wettability of a solid surface by noting the lowest surface tension a liquid can have and still exhibit a contact angle ($\theta$) greater than zero degrees on that solid, was dramatically reduced after treatment of the substrates according to a preferred embodiment.

The Substrate

The membrane or other substrate of the filtration media of preferred embodiments may be prepared from any suitable polymer. The polymer may be a homopolymer, copolymer, terpolymer, or more complex polymer. A single polymer or combination of two or more polymers may be preferred. The polymer may be subjected to a pretreatment, for example, sulfonation or grafting prior to forming a membrane casting dope, or may be subjected to a post-treatment, for example grafting or crosslinking, after a membrane is cast or a substrate is formed. There is no particular molecular weight range limitation for useful polymers.

In a particularly preferred embodiment, the polymer is a sulfone polymer such as polysulfone, polyethersulfone, or polyarylsulfone. Other suitable polymers include fluorinated polymers such as polyvinylidene fluoride (PVDF), polyolefins including polyethylene and polypropylene, polytetrafluoroethylene (PTFE or Teflon™, poly (tetrafluoroethylene-co-ethylene) (ECTFE), acrylic copolymers, polyamides or nylons, polyesters, polyurethanes, polycarbonates, polystyrenes, polyethylene-polyvinyl chloride, polyacrylonitrile, cellulose, and mixtures or combinations thereof.

The substrates that may be coated may be in any suitable shape or form. If the substrate is a membrane, suitable forms include, but are not limited to, sheet and hollow fiber cast polymer membranes.

In general, the overall method of preparing a polymeric membrane includes the steps of providing a casting dope comprising a solution or stable colloidal dispersion. The casting dope is then cast as a thin film and exposed to a gaseous environment. Once the casting dope has been exposed to the gaseous environment, it is coagulated in a quench bath. After coagulating, the resulting polymer membrane may be rinsed in a suitable solvent, then air-dried or oven-dried.

Membranes in sheet form can be cast using any conventional procedure wherein the casting solution or dispersion is spread in a layer onto a nonporous support from which the membrane later can be separated after quenching. The membranes can be cast manually by being poured, cast, or spread by hand onto a casting surface followed by application of a quench liquid onto the casting surface. Alternatively, the membranes may be cast automatically by pouring or otherwise casting the solution onto a moving bed or belt. In casting, particularly in automatic casting, mechanical spreaders can be used. Mechanical spreaders include spreading knives, a doctor blade or spray/pressurized systems. A preferred spreading device is an extrusion die or slot coater which has a chamber into which the casting formulation can be introduced. The casting solution is then forced out of the chamber under pressure through a narrow slot. Membranes may also be cast by means of a doctor blade.

Generally, to produce a membrane, the cast film is exposed to a gaseous environment, such as air, sufficiently long to induce formation of surface pores of the desired size. Following casting and exposure to a gaseous environment, such as air, the cast dispersion or solution is quenched or coagulated. In a preferred embodiment, quenching is accomplished by transporting the cast membrane on a moving belt into the quenching liquid, such as a water bath. Membranes are recovered from the quench bath in the conventional manner by physical removal. The resulting membranes are typically washed free of solvent and may be dried to expel additional increments of solvent, diluent, and quench liquid.

Suitable membranes include both those membranes that are cast from a single polymer solution or dope, generally referred to as "integral" membranes, as well as non-integral or composite membranes that are cast from more than one polymer solution or dope to form a layered or composite membrane. Composite membranes may also be assembled from two or more fully formed membranes after casting, for example, by lamination or other suitable methods. Filtration or exclusion media substrates other than membranes are also suitable for coating with parylene according to preferred embodiments. Non-limiting examples of other suitable substrates include hollow fiber media, melt blown or other nonwoven media, woven media, extruded media, and sedimented media.

The substrates that are suitable for coating in accordance with the preferred embodiments may include membranes having a symmetric or asymmetric pore structure. The term "asymmetric" as used herein relates to a membrane possessing a pore size gradient or having a variation in pore size. That is, asymmetric membranes possess their smallest or finest pores in or adjacent to one surface of the membrane, generally referred to as the "skin" surface or "shiny" side of the membrane. The increase in pore size between the skin surface and the opposite surface of the membrane is generally gradual, with the smallest pore size nearest the skin surface and the largest pores being found at or adjacent to the opposite, coarse-pored surface, generally referred to as the "open" surface or the "dull" side of the membrane. Another variety of asymmetric membrane, commonly described as having a "funnel-with-a-neck" structure, includes both an asymmetric region and an isotropic region, the isotropic region having a uniform pore size. The isotropic region typically extends from the skin surface of the membrane through about 5–80% of the thickness of the membrane, more preferably from about 15–50% of the thickness of the membrane. Another variety of asymmetric membrane has an "hourglass" structure, wherein the largest pore sizes are on either surface of the membrane and the pores become gradually smaller in size towards the interior of the membrane.

The membranes of preferred embodiments also have a porous supporting structure between the two sides of the membrane. The nature of the porous supporting structure of a membrane may depend on the composition of the casting dope and the coagulation bath. The supporting structure can include, for example, closed cells, open cells of substantially the same pore size from one side of the membrane to the other, open cells with a gradation of pore sizes from one portion of the membrane to another, finger-type structures, generally referred to as "macrovoids", and the like. Macrovoids typically vary substantially in size from the surrounding porosity, and generally do not communicate with surface pores. In a preferred embodiment, the porous supporting structure includes a network of structural surfaces capable of contacting a filter stream, defined herein as including any fluid substance, including liquids and gases, that passes through the membrane via the porous supporting structure.

Whether the membrane has an asymmetric or funnel-with-a-neck structure can depend upon several factors involved in the preparation of the membrane, including the type and concentration of the polymer, the solvent, and the nonsolvent; the casting conditions such as the knife gap, and the dope temperature; environmental factors such as the exposure time between casting and quenching, and the humidity of the exposure atmosphere; and the composition and temperature of the quench bath. In various embodiments, the asymmetry in pore size between the skin side and dull side of the membrane can range from about 1:2 or less, 1:3, 1:4, 1:5, 1:6, 1:7, 1:8, 1:9, 1:10, 1:15, 1:20, 1:25, 1:30, 1:40, 1:50, 1:100, or 1:200 to about 1:500, 1:1,000 or 1:10,000 or greater.

Membranes that are suitable for coating in accordance with the preferred embodiments include, for example, membranes that typically possess porosities characteristic of ultrafiltration or microfiltration membranes. Membranes within the ultrafiltration range preferably possess molecular weight cutoffs of from about 10,000 Daltons to about 1,000,000 Daltons and can have pore diameters from about 0.001 $\mu$m or less to about 0.050 $\mu$m on the skin side of the membrane. Microfiltration membranes typically possess pore diameters of from about 0.01 $\mu$m or less, 0.05 $\mu$m, 0.1 $\mu$m, 0.5 $\mu$m, 1.0 $\mu$m, 2.0 $\mu$m, 3.0 $\mu$m to about 5 $\mu$m, 8 $\mu$m, 10 $\mu$m, 20 $\mu$m, or 50 $\mu$m or more on the skin side of the membrane.

Particularly preferred membranes include the highly asymmetric polyethersulfone membranes disclosed in U.S. Pat. No. 5,886,059 (incorporated herein by reference in its entirety). On one side of the PES membrane is a skin face having relatively small diameter pores while the opposite or dull face of the membrane has relatively large diameter pores. The difference in porosity between the skin face and the opposite face is preferably at least between 1:5 to 1:10,000. More preferably, the difference in porosity is between 1:10 or 1:20 and 1:50, 1:100, or 1:200. In addition, such membranes have a gradual change in pore size from the skin face to the opposite face. Thus, during filtration, larger particles can enter the membrane through the larger pores, but do not exit through the smaller pores. Because the larger particles do not become lodged at the outer surface, the membranes made by the methods provided herein are not easily clogged with large particles.

Hydrophilic membranes may also be coated according to the preferred embodiments. Such hydrophilic membranes include hydrophobic membranes that are post-treated with a surfactant or other material capable of rendering the membrane hydrophilic, as well as membranes prepared from a casting dope containing a hydrophilic material in addition to a hydrophobic polymer.

The filtration media of the preferred embodiments may include composite membranes. Composite membranes are membranes having multiple layers, and are useful in a variety of separation applications. In many cases, the various layers of a composite membrane each impart different desirable properties to the composite. For example, in some applications, an extremely thin membrane may have advantageous flow rates in separations of very small particles, gases, and the like. Yet such a thin membrane may be fragile and difficult to handle or to package into cartridges. In such cases, the fragile, thin layer membrane may be combined with a backing or with a stronger, more porous membrane, to form a composite having improved strength and handling characteristics without sacrificing the separation properties of the thin layer membrane. Other desirable properties imparted by laminating one membrane to another media may include increased burst strength, increased thickness, providing prefiltration capability, and providing an adhesive layer to ease assembly of a device.

Composite membranes may be prepared using lamination techniques, wherein sheets are layered together in a stack, optionally with one or more adhesive materials placed between the sheets to facilitate binding and lamination of the sheets to each other, and the stack is laminated into an integral composite membrane under application of heat and pressure. A different approach to making composite membranes is to cast or form one membrane layer in situ on top of another layer. The base layer may be a fibrous backing material or it may be a membrane. The composites may include, for example, composites having different layers of any of the foregoing media, composites having multiple layers of the same medium, or composites having layers of the same medium, but of different pore sizes, porosities, geometries, orientations, and the like. The composites may also include, for example, at least one of the foregoing filtration media with one or more additional layers of nonfiltration media such as backings or adhesives. The composite may be formed either before or after a membrane component is coated with parylene according to a preferred embodiment.

Composite filtration media of the preferred embodiments are not limited to composites including membranes. Composites including other filtration media, for example, nonwoven fibers or any other suitable non-membrane filtration media, are also contemplated.

In one type of composite, an oleophobic filtration medium of the preferred embodiment is bonded to a textile fabric or other woven or nonwoven material to form a layered fabric capable of excluding the passage of liquid while allowing passage of vapors and gases therethrough. Such a layered fabric can be useful in a variety of applications, as will be appreciated by those or ordinary skill in the art. Bonding an oleophobic filtration medium, such as a membrane, to a fabric may be accomplished by conventional adhesives, thermal bonding, and the like. In this embodiment, the filtration medium may be coated prior to, simultaneously with, or after the layering of the filtration medium with the fabric.

Any polymer capable of being processed into filtration media using conventional methods, such as, for example, melt-blown techniques, or that can be formed into a membrane by a casting or other process and that can be rendered oleophobic through coating with parylene is generally suitable for use in the preferred embodiments. Generally, oleophobicity is a characteristic of materials exhibiting repulsion to oils. Oleophobic materials repulse oils and possess a low surface tension value and are wetted by low surface tension liquids such as alcohol.

The Coating Material and Method

The membranes and other substrates of the preferred embodiments are generally provided with a parylene coating. Three types of parylene, available commercially under the GALAXYL trademark from Montell Polyolefins of Brussels, Belgium and distributed in the United States by PARA TECH Coating, Inc. of Aliso Viejo, Calif., may be preferred in various embodiments: GALAXYL™ Parylene N, GALAXYL™ Parylene C, and GALAXYL™ Parylene D. GALAXYL™ Parylene N is poly-para-xylene which is derived from para-xylene dimer. GALAXYL™ Parylene C is poly-monochloro-para-xylene which is derived from monochloro-para-xylene dimer. Poly-monochloro-para-xylene coatings, such as GALAXYL™ Parylene C, are preferred coatings for filters suitable for use in medical devices. Poly-monochloro-para-xylene coatings offer good chemical resistance and the ability to withstand repeated steam sterilization without significant coating degradation. Different parylene coatings may be preferred for different applications, as will be appreciated by one skilled in the art.

Also, related compounds, such as, for example, meta-xylenes or ortho-xylenes, and various derivatives thereof may be suitable for use in certain embodiments.

The coating material of preferred embodiments is derived from one or more para-xylene dimers. The dimer in powder form is converted to a gaseous monomer that condenses and polymerizes on substrates at room temperature, forming a parylene coating. Unlike dip, spray or condensation coatings, a parylene coating does not run off the substrate or sag, is pinhole free, and does not bridge. Parylene may therefore coat a membrane evenly over the external surfaces of the membrane and the porous structures on the interior of the membrane. The thinnest parylene coatings that can be deposited using the vacuum application system described below are typically below 500 Å thick. Films having thicknesses from about 500 Å up to about 100 nm or higher may typically be deposited in preferred embodiments, however there is no absolute upper limit on film thickness. In preferred embodiments, the parylene layer deposited on the membrane substrate is from about 500 or less, 600, 700, 750, 800, 850, 900, 950 or 1000 Å thick to about 10, 15, 20, 25, 30, 35, 40, 45, 50, 60, 70, 80, 90, or 100 $\mu$m thick or more. The larger the minimum pore size of the membrane to be coated, the thicker the coating that may be deposited without substantially affecting porosity.

In preferred embodiments, a single kind of parylene may be deposited in a coating. Alternatively, a mixture of two or more kinds of parylene may be deposited to form a single coating of mixed chemistries, or successive coating layers may be built up by depositing different layers having different chemistries. The preferred type and method of coating may vary depending upon the application, as will be recognized by one skilled in the art.

Some of the properties of parylene films include high reliability, true conformality, light weight, wide temperature range, stress-free, radiation resistance, low coefficient of friction, transparency, particle retention, virtually no outgassing, solvent resistance, low permeability to moisture and gases, acid and base resistance, fungus and bacteria resistance, extremely high dielectric strength, and high tensile and yield strength. Parylene is biocompatible, and is commercially available in a form having a USP XXII, Class VI biocompatibility rating.

Poly-para-xylene is generally applied to the substrate using a vacuum application system. A para-xylene dimer powder is typically placed in a vacuum system vaporization chamber and is heated to a temperature of +150° C. to convert the powder into vapor form. Next, the dimer in vapor form may be converted in a pyrolysis chamber to reactive para-xylene vapor via pyrolysis at 650° C. The reactive vapor may then be transferred to a polymerization chamber containing the membrane to be coated. The polymerization chamber may be maintained at ambient temperature. The reactive vapor typically polymerizes on the surface of the substrate, forming a uniform parylene coating. Parylene deposition systems are available from PARA TECH Coating, Inc. of Aliso Viejo, Calif.

In a preferred embodiment, deposition of the parylene layer is controlled so as to only partially coat the substrate. For example, a parylene coating may be applied on a membrane on one surface only in a layer not fully penetrating the pores through the entire thickness of the membrane. The parylene layer may also be deposited in a "polka dot" geometry on a substrate. A "polka dot" geometry is defined as a generally regular array of areas having a circular or other shaped profile including deposited parylene and separated from each other by areas of bare substrate with no deposited parylene. The "polka dot" geometry is particularly useful in combination air vent and filter applications.

The thickness of the parylene film is typically controlled by controlling the length of time that the parylene is allowed to flow into the polymerization chamber. However, other methods may be preferred for controlling the coating thickness, as will be appreciated by one skilled in the art.

The Parylene Coated Substrates

The parylene-coated substrates of the preferred embodiments have high permeabilities for airflow and reject liquid water, as evidenced by high water penetration pressures. Airflow through a membrane can be measured in units of Gurley Flow. Gurley Flow is the time in seconds it takes 300 ml of air to pass through a 1" diameter membrane under the force of a 5 oz weight. Gurley Flow may be measured using a Model 4110 GENUINE GURLEY™ Densometer manufactured by Gurley Precision Instruments of Troy, N.Y.

Water penetration is determined by measuring the pressure in pounds per square inch differential (psid) required to force water through the membrane. Pounds per square inch differential is the difference in pressure existing on opposite sides of a membrane. In comparing two membranes having similar porosity, the water penetration pressure correlates with the membrane's relative hydrophobicity, wherein a high water penetration pressure indicates that a membrane is more hydrophobic than a membrane having a lower water penetration pressure.

EXAMPLES

Two different membranes were coated with GALAXYL Parylene C, and the effect on mean flow pore (MFP) size, Gurley Flow, and water penetration by the coating process was determined. One of the membranes was a polysulfone membrane having a 1.0 μm MFP (CVO-1 sold by USF Filtration and Separations Group, San Diego, Calif.), and the other was a polysulfone membrane having a MFP size of 5 μm (MMM5 available from US Filter of San Diego, Calif.). The membranes, in the form of sheets, were placed in a Model 4000 Parylene Deposition System (manufactured by PARA TECH Coatings, Inc.) for coating with GALAXYL Parylene C. Parylene C dimer powder (150 grams) was placed in the system's vaporization chamber and heated to vaporize the powder. The vaporized dimer was allowed to flow into the system's pyrolysis chamber, operated at a temperature of 357° C., where it was converted into reactive vapor. The reactive vapor was then allowed to flow into the system's polymerization chamber at the rate of 0.83 g/min. The polymerization chamber, operated at room temperature, contained approximately 929 cm² of the membrane in the form of a square sheet. The membrane was laid flat on the bottom of the chamber. After flow of the reactive vapor was discontinued, the coated membrane was recovered from the polymerization chamber.

MFP, Gurley Flow, and Water Penetration data for the two membranes, both before and after coating with Parylene C, is provided in Table 1. The data indicate that the coating process results in improved airflow through the coated membrane, as shown by an increase in Gurley Flow after coating. The Water Penetration data also show that the hydrophobicity of the membrane is increased by coating with Parylene C. The data also show that the improvements in airflow and hydrophobicity are attained without a substantial decrease in MFP.

TABLE 1

| | | Before Treatment | | | After Treatment | | Water |
|---|---|---|---|---|---|---|---|
| Example | Type | MFP (μm) | Gurley Flow (@300 ml) | Hydrophilicity | MFP (μm) | Gurley Flow (@300 ml) | Penetration (psid) |
| 1 (0069E1S1) | CVO-1 | 2.5 | 22.7 | Hydrophilic | 2.4 | 25.6 | 8.5 |
| 2 (0227PL1) | MMM5 | 6.8 | 3.4 | Hydrophilic | 5.3 | 5.3 | 7 |

The above description provides several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A coated filter comprising a polymeric substrate and a coating, the coating comprising a polymeric para-xylene.

2. The coated filter of claim 1, the coating existing in an amount sufficient to render the coated filter permanently oleophobic.

3. The coated filter of claim 1, wherein the polymeric substrate comprises a polysulfone.

4. The coated filter of claim 3, wherein the polysulfone is selected from the group consisting of polyalkylsulfone, polyethersulfone, and polyarylsulfone.

5. The coated filter of claim 1, wherein the polymeric substrate comprises a polymer selected from the group consisting of polyvinylidene fluoride, polyolefin, polytetrafluoroethylene, poly(tetrafluoroethylene-co-ethylene), acrylic copolymer, polyamide, nylon, polyester, polyurethane, polycarbonate, polystyrene, polyethylene-polyvinyl chloride, polyacrylonitrile, cellulose, and mixtures thereof.

6. The coated filter of claim 5, wherein the polyolefin is selected from the group consisting of polyethylene, polypropylene, and mixtures thereof.

7. The coated filter of claim 1, wherein the polymeric substrate comprises a porous membrane.

8. The coated filter of claim 7, wherein the porous membrane comprises an isotropic membrane.

9. The coated filter of claim 7, wherein the porous membrane comprises an asymmetric membrane.

10. The coated filter of claim 9, wherein the asymmetric membrane has a supporting structure, a first porous face having a first average pore diameter and a second porous face having a second average pore diameter, and wherein an asymmetry between the first average pore diameter and the second average pore diameter is at least about 2:1.

11. The coated filter of claim 10, wherein the asymmetry between the first average pore diameter and the second average pore diameter is at least about 5:1.

12. The coated filter of claim 11, wherein the asymmetry between the first average pore diameter and the second average pore diameter is at least about 10:1.

13. The coated filter of claim 12, wherein the asymmetry between the first average pore diameter and the second average pore diameter is at least about 20:1.

14. The coated filter of claim 13, wherein the asymmetry between the first average pore diameter and the second average pore diameter is at least 200:1.

15. The coated filter of claim 10, wherein the supporting structure comprises an isotropic region adjacent the second porous face, the isotropic region having a substantially constant pore size, the supporting structure further comprising an asymmetric region adjacent the isotropic region.

16. The coated filter of claim 15, wherein the isotropic region extends through from about 5% to about 80% of the supporting structure.

17. The coated filter of claim 16, wherein the isotropic region extends through from about 15% to about 50% of the supporting structure.

18. The coated filter of claim 10, wherein the second average pore diameter is between about 0.01 $\mu$m and about 50.0 $\mu$m.

19. The coated filter of claim 18, wherein the second average pore diameter is between about 0.05 $\mu$m and about 20.0 $\mu$m.

20. The coated filter of claim 10, wherein the second average pore diameter is less than about 0.01 $\mu$m.

21. The coated filter of claim 1, wherein the polymeric substrate comprises a material selected from the group consisting of nonwoven material, woven material, and melt blown material.

22. The coated filter of claim 1, wherein the poly-para-xylene comprises a poly-monochloro-para-xylene.

23. The coated filter of claim 1, wherein the poly-para-xylene comprises an unsubstituted poly-para-xylene.

24. The coated filter of claim 1, further comprising a support, wherein the coated filter is bonded to the support.

25. The coated filter of claim 24, wherein the support comprises a fabric.

26. The coated filter of claim 24, wherein the support comprise a material selected from the group consisting of woven material and nonwoven material.

27. A method of producing a coated filter, comprising the steps of:

providing a para-xylene dimer and a polymeric substrate;

vaporizing the para-xylene dimer to form a para-xylene dimer vapor;

pyrolyzing the para-xylene dimer vapor to form a reactive para-xylene monomer;

depositing the reactive para-xylene monomer on the polymeric substrate, whereby a poly-para-xylene coating is formed on the substrate; and recovering a coated filter.

28. The method of claim 27, further comprising the steps of:

providing a support; and bonding the coated filter to the support.

29. The method of claim 27, further comprising the steps of:

providing a support; and bonding the polymeric substrate to the support.

* * * * *